(12) United States Patent
Tumula et al.

(10) Patent No.: US 10,931,427 B2
(45) Date of Patent: Feb. 23, 2021

(54) NETWORK NODE, CLIENT DEVICE AND METHODS THEREOF

(71) Applicant: Huawei Technologies Co., Ltd., Shenzhen (CN)

(72) Inventors: Chaitanya Tumula, Kista (SE); Neng Wang, Kista (SE); Sergei Semenov, Kista (SE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/368,631

(22) Filed: Mar. 28, 2019

(65) Prior Publication Data
US 2019/0229877 A1     Jul. 25, 2019

Related U.S. Application Data

(63) Continuation of application No. PCT/EP2016/073196, filed on Sep. 29, 2016.

(51) Int. Cl.
| | |
|---|---|
| *H04L 5/00* | (2006.01) |
| *H04L 1/18* | (2006.01) |
| *H04W 72/04* | (2009.01) |
| *H04W 72/12* | (2009.01) |
| *H04W 72/14* | (2009.01) |

(52) U.S. Cl.
CPC .......... *H04L 5/0055* (2013.01); *H04L 1/1819* (2013.01); *H04L 1/1861* (2013.01); *H04L 1/1896* (2013.01); *H04W 72/0446* (2013.01); *H04W 72/1263* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 9,369,241 B2 | 6/2016 | Djukic et al. | |
| 2011/0007834 A1* | 1/2011 | Hoshino | H04L 1/0001 |
| | | | 375/285 |

(Continued)

FOREIGN PATENT DOCUMENTS

| | | |
|---|---|---|
| CN | 101809925 A | 8/2010 |
| SG | 182955 A1 | 8/2012 |
| WO | 2015191356 A1 | 12/2015 |

*Primary Examiner* — Otis L Thompson, Jr.
(74) *Attorney, Agent, or Firm* — Leydig, Voit & Mayer, Ltd.

(57) ABSTRACT

A network node receives a first signal in a first grant-free transmission from a client device, wherein the first signal comprises data having a first redundancy version and having a corresponding first transmission attempt number, in a first resource unit; determines an identity of the client device based on the first signal, establishes that a data decoding error associated with the first grant-free transmission has occurred if the data in the first signal cannot be decoded correctly; receives a second signal in a second transmission from the client device, wherein the second signal comprises the data having a second redundancy version and having a corresponding second transmission attempt number, in a second resource unit; and establishes that a data decoding error associated with the second transmission has occurred if the data in the second signal cannot be decoded correctly.

17 Claims, 10 Drawing Sheets

(56) References Cited

U.S. PATENT DOCUMENTS

| | | | |
|---|---|---|---|
| 2012/0027148 A1* | 2/2012 | Sgraja | H04B 1/7085 |
| | | | 375/359 |
| 2013/0223485 A1 | 8/2013 | Bai et al. | |
| 2014/0177456 A1* | 6/2014 | Boudreau | H04W 72/0406 |
| | | | 370/252 |
| 2014/0254544 A1 | 9/2014 | Kar Kin Au et al. | |
| 2016/0219627 A1* | 7/2016 | Au | H04W 74/0841 |
| 2016/0353453 A1* | 12/2016 | Au | H04W 74/006 |
| 2017/0288817 A1* | 10/2017 | Cao | H04L 1/1887 |
| 2018/0092125 A1* | 3/2018 | Sun | H04W 74/02 |
| 2019/0068261 A1* | 2/2019 | Priyanto | H04L 1/1819 |
| 2019/0165872 A1* | 5/2019 | Matsuda | H04W 72/04 |
| 2019/0229863 A1* | 7/2019 | Lei | H04L 5/0053 |
| 2019/0253193 A1* | 8/2019 | Kim | H04L 1/0003 |
| 2019/0261354 A1* | 8/2019 | Fakoorian | H04L 1/1896 |
| 2019/0312686 A1* | 10/2019 | Harada | H04L 1/1819 |
| 2019/0327030 A1* | 10/2019 | Yoshimoto | H04W 28/04 |
| 2020/0029270 A1* | 1/2020 | Matsuda | H04L 5/0033 |

\* cited by examiner ns thereof

CROSS-REFERENCE TO RELATED APPLICATIONS

This application is a continuation of International Application No. PCT/EP2016/073196, filed on Sep. 29, 2016, the disclosure of which is hereby incorporated by reference in its entirety.

TECHNICAL FIELD

The disclosure relates to a network node and a client device. Furthermore, the disclosure also relates to corresponding methods, a computer program, and a computer program product.

BACKGROUND

For the future generation wireless standards, grant-free uplink (UL) transmissions are being considered to reduce the overhead associated with the data transmission from a user equipment (UE) to a base station (e.g. a macro-eNodeB, a pico-eNodeB, or a home eNodeB) and the transmission latency. Grant-free UL transmissions can be used to serve massive machine type communication (mMTC) and ultra-reliable low latency communication (URLLC) services.

On the time-frequency resources allocated for grant-free UL transmissions, there is a possibility that more than one UE can transmit its data on a given time-frequency resource in a contention-based manner. Multiple UEs transmitting on the same time-frequency resource unit (RU) in a grant-free transmission mode typically use orthogonal signatures for data and reference signal transmission. The receiving base station then blindly performs the detection of the UEs transmitting on a given RU, estimation of their channel coefficients and detection of their data.

In a first conventional solution, it was proposed that eNodeB can send acknowledgement (ACK) or Negative ACK (NACK) signals to UEs for successful and unsuccessful decoding of their data, respectively. The eNodeB may change the allocation (also known as remapping) of the RUs in the contention transmission unit (CTU) to the UEs and signal this information to the UEs. This may result in a performance improvement.

In a second conventional solution related to grant-free transmissions from the UE to eNodeB, it was proposed that UE can transmit a second frame containing at least a portion of the data and information identifying the first frame toward the receiver using the blind detection protocol. The information identifying the first frame includes a resource unit (RU) used in the transmitting of the first frame. This method of signalling information about the first frame during the transmission of second frame can help in performing Hybrid Automatic Repeat reQuest (HARQ) combining and obtaining a performance improvement.

By employing the first conventional solution, additional downlink signalling needs to be transmitted frequently about the remapping of the RUs in a CTU region to the UEs associated with an eNodeB.

By employing the second conventional solution, a part of the resources in the UL grant-free transmissions are wasted to carry the identifying information about the previous (possibly unsuccessful) transmissions.

SUMMARY

An objective of embodiments of the invention is to provide a solution which mitigates or solves the drawbacks and problems of conventional solutions.

Another objective of embodiments of the invention is to provide a solution which can handle client device activity detection error scenarios that have not been considered previously for grant-free transmissions from client devices to network nodes.

An "or" in this description and the corresponding claims is to be understood as a mathematical OR which covers "and" and "or", and is not to be understand as an XOR (exclusive OR).

According to a first aspect of the invention, the above mentioned and other objectives are achieved with a client device for a wireless communication system, the client device being configured to transmit a first signal in a first grant-free transmission to a network node, wherein the first signal comprises data having a first redundancy version and having a corresponding first transmission attempt number, in a first resource unit;

establish that a Negative Acknowledgment (NACK) associated with a data decoding error for the first grant-free transmission has been received by the client device or that a ACK or NACK time-out associated with a client device activity detection error for the first grant-free transmission has occurred;

transmit a second signal in a second grant-free transmission to the network node, wherein the second signal comprises the data having a second redundancy version and having a corresponding second transmission attempt number, in a second resource unit.

A resource unit (RU) in this disclosure corresponds to a time-frequency resource. For example, a resource unit may consist of a set of subcarriers along the frequency-dimension in one or more transmit symbols along the time-dimension. Different resource units can be of different sizes.

Data decoding error in this disclosure corresponds to the negative outcome of a test performed at the network node to check the correctness of the data received from the client device. For example, the test can comprise of performing a cyclic redundancy check of the received data.

The network node in general receives a signal comprising of reference signals and/or data from the client device along with signals from other client devices, i.e. a superposed signal. The network node does not have knowledge about which of the client devices sent their data at a given time slot. Typically each client device uses an orthogonal signature sequence for its data and reference signal transmission. After receiving signals from multiple client devices at the same time, the network node needs to identify if the particular client device is active (i.e. has sent data) or not. For this purpose, the network performs a client device activity test, which can for example include computing a correlation coefficient between the received reference signals with a set of known client device signatures, and comparing the resulting value against a threshold value. Even though the client device has transmitted data to the network node, outcome of the test performed by the network node corresponding to the client device can be negative. Such an error event is denoted as a client device activity detection error in this disclosure.

The second signal is to be transmitted after the establishment that a NACK associated with a data decoding error for the first grant-free transmission has been received or that an ACK or NACK time-out associated with a client device activity detection error for the first grant-free transmission has occurred.

The client device according to the first aspect provides a number of advantages over convention solutions. One such advantage is that the client device according to the first aspect provides a transmission mechanism from the client device in case of a client device activity detection error after the transmission of the first signal.

In a first possible implementation form of a client device according to the first aspect, the client device is further configured to establish that a NACK associated with a data decoding error for the second grant-free transmission has been received by the client device or that a ACK or NACK time-out associated with a client device activity detection error for the second grant-free transmission has occurred;

transmit a third signal in a third grant-free transmission to the network node, wherein the third signal comprises the data having a third redundancy version and having a corresponding third transmission attempt number, in a third resource unit.

The first implementation form provides a transmission mechanism from the client device in case of a client device activity detection error after the transmission of the second signal.

In a second possible implementation form of a client device according to the first implementation form of the first aspect, the first grant-free transmission comprises a first new data indicator flag and information about the first redundancy version, the second grant-free transmission comprises a second new data indicator flag and information about the second redundancy version, and the third grant-free transmission comprises a third new data indicator flag and information about the third redundancy version.

The second implementation form provides an advantage in that by signaling information about the redundancy versions and new data indicator flag along with each grant-free transmission, the network node can perform hybrid automatic repeat request combining of the data received in multiple transmissions from the client device.

In a third possible implementation form of a client device according to the first implementation form of the first aspect, the client device is further configured to choose a redundancy version for the data to be transmitted in dependence on the transmission attempt number, and wherein a correspondence between redundancy version and transmission attempt number is predetermined.

Predetermined in this context may mean pre-defined (e.g. fixed) in conformance with a communication standard, such as 3GPP standards.

The client device maintains a transmission attempt counter for each data transmission, and updates the transmission attempt number (TAN) based on client device activity detection error and ACK/NACK feedback from the network node.

The third implementation form is an alternative method for the second possible implementation form and it provides an advantage in that the client device does not need to send information about the redundancy version contained in a given transmission to the network node. Hence, signaling overhead in the system is reduced.

In a fourth possible implementation form of a client device according to the third implementation form of the first aspect, the client device is further configured to at least one of upon establishing that the NACK associated with a data decoding error for the first grant-free transmission has been received by the client device, choose the second transmission attempt number to be equal to the first transmission attempt number incremented by one; and upon establishing that the NACK associated with a data decoding error for the second grant-free transmission has been received by the client device, choose the third transmission attempt number to be equal to the second transmission attempt number incremented by one.

The predetermined mapping of transmission attempt number to redundancy version in the third implementation form may be used in the fourth implementation form.

The fourth implementation form is beneficial for the client device in that it provides a simple mechanism to select the redundancy versions based on the transmission attempt number. The proposed mechanism of the fourth implementation form does not require additional signaling from the network node to notify the client device about the redundancy version to be used for the next transmission. Hence, signaling overhead in the system is reduced.

In a fifth possible implementation form of a client device according to the third or fourth implementation form of the first aspect, the client device is further configured to upon establishing that the ACK or NACK time-out associated with a client device activity detection error for the first grant-free transmission has occurred, choose the second transmission attempt number to be the same as the first transmission attempt number (so that the second redundancy version is the same as the first redundancy version); or upon establishing that the ACK or NACK time-out associated with a client device activity detection error for the second grant-free transmission has occurred, choose the third transmission attempt number to be the same as the second transmission attempt number (so that the third redundancy version is the same as the second redundancy version).

The fifth implementation form is beneficial because the operation of the client device after an ACK or NACK time-out associated with the client device activity detection error is transparent to the network node, i.e., that network node can receive and process the next transmission from the client device without requiring any additional signaling.

In a sixth possible implementation form of a client device according to any of the first to fifth implementation forms of the first aspect or to the first aspect as such, wherein at least one of the first resource unit, the second resource unit, and the third resource unit is predetermined.

The sixth implementation form is advantageous in that the client device does not require signaling from the network node regarding the resource unit it should use for the transmissions to the network node. Hence, signaling overhead in the system is reduced.

In a seventh possible implementation form of a client device according to any of the first to fifth implementation forms of the first aspect or to the first aspect as such, the client device is further configured to choose at least one of the first resource unit, the second resource unit, and the third resource unit in dependence on at least one of the identity of the client device, a grant-free transmission sub-frame number, and a transmission attempt number.

The seventh implementation form provides an advantage in that it results in reducing the collisions of retransmissions from one or more client devices. The seventh implementation form may also randomize interference experienced by the different transmissions of the same data from the client device.

In an eight possible implementation form of a client device according to any of the preceding implementation forms of the first aspect or to the first aspect as such, the client device is further configured to at least one of receive a NACK associated with the first grant-free transmission and a first scheduling grant from the network node, transmit the second signal using information in the first scheduling grant; and receive a NACK associated with the second grant-free transmission and a second scheduling grant from the network node, transmit the third signal using information in the second scheduling grant.

The eight implementation form is advantageous in that the information in scheduling grant may allocate resources for the next transmission from the client device in a contention-free resource region, and may result in a better performance for the transmissions from the client device.

According to a second aspect of the invention, the above mentioned and other objectives are achieved with a network node for a wireless communication system, the network node being configured to receive a first signal in a first grant-free transmission from a client device, wherein the first signal comprises data having a first redundancy version and having a corresponding first transmission attempt number, in a first resource unit;

determine an identity of the client device based on the first signal, and establish that a data decoding error associated with the first grant-free transmission has occurred if the data in the first signal cannot be decoded correctly (and expect a second signal to be received from the client device);

receive a second signal in a second grant-free transmission from the client device, wherein the second signal comprises the data having a second redundancy version and having a corresponding second transmission attempt number, in a second resource unit;

establish that a client device activity detection error associated with the second grant-free transmission has occurred if the second signal does not pass a client device activity detection test, and establish that a data decoding error associated with the second grant-free transmission has occurred if the data in the second signal cannot be decoded correctly.

In a grant-free transmission mode, the network node in general receives a signal comprising of reference signals and data from the client device along with signals from other client devices, i.e. a superposed signal. Hence, the first and the second signals received by the network node may also contain data transmitted by other client devices. The network node does not have the knowledge of which of the client devices sent their data at a given time slot. Typically, each client device uses an orthogonal signature sequence for its data and reference signal transmission. After receiving a signal which is a superposition of signals transmitted from multiple client devices at the same time, the network node needs to identify if the particular client device is active (sent data) or not. For this purpose, the network performs a client device activity test, which can for example include computing a correlation coefficient between the received reference signals with a set of known client device signatures, and comparing the resulting value against a threshold value. If the outcome of this test is positive, the network node can know the identity of the client device and send the ACK/NACK feedback signals to the client device. If the outcome of this test is negative, such an error event is denoted as a client device activity detection error in this disclosure.

After unsuccessful reception of the first grant-free transmission, the network node expects a second grant-free transmission. A client device activity detection error is established at the network node if the second grant-free transmission does not pass the client device activity test performed by the network node.

The network node according to the second aspect provides advantage over convention solutions in that the network node may detect client device activity detection error associated with second grant-free transmission from the client device.

In a first possible implementation form of a network node according to the second aspect, the network node is further configured to upon establishing that the data decoding error associated with the first grant-free transmission has occurred, transmit a NACK associated with the first grant-free transmission and a first scheduling grant to the client device based on the determined identity, e.g. using downlink control signaling.

The first implementation form is advantageous for the network node in that the network node may schedule the next transmission from the client device in a grant-based (possibly collision free) resource region and provide a better service to the client device.

In a second possible implementation form of a network node according to the first implementation form of the second aspect or to the second aspect as such, the network node is further configured to transmit a NACK associated with the second grant-free transmission to the client device based on the determined identity (e.g. using downlink control signaling) if the client device activity detection error associated with the second grant-free transmission has occurred.

The second implementation form is beneficial in that the network node may not perform data decoding associated with second grant-free transmission from client device and send a NACK signal immediately after establishing a client device activity detection error.

In a third possible implementation form of a network node according to the first or second implementation forms of the second aspect or to the second aspect as such, the network node is further configured to transmit a NACK associated with the second grant-free transmission and a second scheduling grant to the client device based on the determined identity, e.g. using downlink control signaling.

The third implementation form is advantageous for the network node in that the network node may schedule the next transmission from the client device in grant-based (possibly collision free) resource region and provide a better service to the client device.

In a fourth possible implementation form of a network node according to any of the first to third implementation forms of the second aspect or to the second aspect as such, wherein the first grant-free transmission comprises a first new data indicator flag and information about the first redundancy version of the data to decode the data associated with the first grant-free transmission, wherein the second grant-free transmission comprises a second new data indicator flag and information about the second redundancy version of the data to decode the data associated with the first grant-free transmission and the second grant-free transmission.

The fourth implementation form may facilitate the network node to obtain the redundancy version information and the new data indicator flag associated with the transmissions from the client device and perform hybrid automatic repeat request combining to obtain a better data decoding performance.

In a fifth possible implementation form of a network node according to any of the first to fourth implementation forms of the second aspect or to the second aspect as such, the network node is further configured to obtain a redundancy version information for decoding the data in dependence on the transmission attempt number and wherein a correspondence between redundancy version and transmission attempt number is predetermined.

The network node maintains a transmission attempt counter for data received from the client device, and updates the transmission attempt number (TAN) based on client device activity detection error and/or the data decoding error of the client device data. Using the TAN, the network node deduces the redundancy version number of a given transmission from the client device to perform HARQ combining for data decoding.

The fifth implementation form may facilitate the network node to obtain information regarding the redundancy version contained in a data transmission from the client device without needing additional signaling. Hence, signaling overhead in the system is reduced.

According to a third aspect of the invention, the above mentioned and other objectives are achieved with a method for a client device, the method comprising:

transmitting a first signal in a first grant-free transmission to a network node, wherein the first signal comprises data having a first redundancy version and having a corresponding first transmission attempt number, in a first resource unit;

establishing that a Negative Acknowledgment (NACK) associated with a data decoding error for the first grant-free transmission has been received by the client device or that a ACK or NACK time-out associated with a client device activity detection error for the first grant-free transmission has occurred;

transmitting a second signal in a second grant-free transmission to the network node, wherein the second signal comprises the data having a second redundancy version and having a corresponding second transmission attempt number, in a second resource unit.

In a first possible implementation form of a method according to the third aspect, the method comprising establishing that a NACK associated with a data decoding error for the second grant-free transmission has been received by the client device or that a ACK or NACK time-out associated with a client device activity detection error for the second grant-free transmission has occurred;

transmitting a third signal in a third grant-free transmission to the network node, wherein the third signal comprises the data having a third redundancy version and having a corresponding third transmission attempt number, in a third resource unit.

In a second possible implementation form of a method according to the first implementation form of the third aspect, the first grant-free transmission comprises a first new data indicator flag and information about the first redundancy version, the second grant-free transmission comprises a second new data indicator flag and information about the second redundancy version, and the third grant-free transmission comprises a third new data indicator flag and information about the third redundancy version.

In a third possible implementation form of a method according to the first implementation form of the third aspect, the method comprising choosing a redundancy version for the data to be transmitted in dependence on the transmission attempt number, and wherein a correspondence between redundancy version and transmission attempt number is predetermined.

In a fourth possible implementation form of a method according to the third implementation form of the third aspect, the method comprising at least one of upon establishing that the NACK associated with a data decoding error for the first grant-free transmission has been received by the client device, choosing the second transmission attempt number to be equal to the first transmission attempt number incremented by one; and upon establishing that the NACK associated with a data decoding error for the second grant-free transmission has been received by the client device, choosing the third transmission attempt number to be equal to the second transmission attempt number incremented by one.

In a fifth possible implementation form of a method according to the third or fourth implementation form of the third aspect, the method comprising upon establishing that the ACK or NACK time-out associated with a client device activity detection error for the first grant-free transmission has occurred, choosing the second transmission attempt number to be the same as the first transmission attempt number (so that the second redundancy version is the same as the first redundancy version); or upon establishing that the ACK or NACK time-out associated with a client device activity detection error for the second grant-free transmission has occurred, choosing the third transmission attempt number to be the same as the second transmission attempt number (so that the third redundancy version is the same as the second redundancy version).

In a sixth possible implementation form of a method according to any of the first to fifth implementation forms of the third aspect or to the third aspect as such, wherein at least one of the first resource unit, the second resource unit, and the third resource unit is predetermined.

In a seventh possible implementation form of a method according to any of the first to fifth implementation forms of the third aspect or to the third aspect as such, the method comprising choosing at least one of the first resource unit, the second resource unit, and the third resource unit in dependence on at least one of the identity of the client device, a grant-free transmission sub-frame number, and a transmission attempt number.

In an eight possible implementation form of a method according to any of the preceding implementation forms of the third aspect or to the third aspect as such, the method comprising receiving a NACK associated with the first grant-free transmission and a first scheduling grant from the network node, transmitting the second signal using information in the first scheduling grant; and receiving a NACK associated with the second grant-free transmission and a second scheduling grant from the network node, transmitting the third signal using information in the second scheduling grant.

According to a fourth aspect of the invention, the above mentioned and other objectives are achieved with a method for a network node, the method comprising receiving a first signal in a first grant-free transmission from a client device, wherein the first signal comprises data having a first redundancy version and having a corresponding first transmission attempt number, in a first resource unit;

determining an identity of the client device based on the first signal, and establishing that a data decoding error associated with the first grant-free transmission has occurred if the data in the first signal cannot be decoded correctly (and expect a second signal to be received from the client device);

receiving a second signal in a second grant-free transmission from the client device, wherein the second signal comprises the data having a second redundancy version and having a corresponding second transmission attempt number, in a second resource unit;

establishing that a client device activity detection error associated with the second grant-free transmission has occurred if the second signal does not pass a client device activity detection test, and establishing that a data decoding error associated with the second grant-free transmission has occurred if the data in the second signal cannot be decoded correctly.

In a first possible implementation form of a method according to the fourth aspect, the method comprising upon establishing that the data decoding error associated with the first grant-free transmission has occurred, transmitting a NACK associated with the first grant-free transmission and a first scheduling grant to the client device based on the determined identity, e.g. using downlink control signaling.

In a second possible implementation form of a method according to the first implementation form of the fourth aspect or to the fourth aspect as such, the method comprising transmitting a NACK associated with the second grant-free transmission to the client device based on the determined identity (e.g. using downlink control signaling) if the client device activity detection error associated with the second grant-free transmission has occurred.

In a third possible implementation form of a method according to the first or second implementation forms of the fourth aspect or to the fourth aspect as such, the method comprising transmitting a NACK associated with the second grant-free transmission and a second scheduling grant to the client device based on the determined identity, e.g. using downlink control signaling.

In a fourth possible implementation form of a method according to any of the first to third implementation forms of the fourth aspect or to the fourth aspect as such, wherein the first grant-free transmission comprises a first new data indicator flag and information about the first redundancy version of the data to decode the data associated with the first grant-free transmission, wherein the second grant-free transmission comprises a second new data indicator flag and information about the second redundancy version of the data to decode the data associated with the first grant-free transmission and the second grant-free transmission.

In a fifth possible implementation form of a method according to any of the first to fourth implementation forms of the fourth aspect or to the fourth aspect as such, the method comprising obtaining a redundancy version information for decoding the data in dependence on the transmission attempt number and wherein a correspondence between redundancy version and transmission attempt number is predetermined.

The advantages of any method according to the third aspect or the fourth aspect, respectively, are the same as those for the corresponding device claims according to the first and second aspects, respectively.

The disclosure also relates to a computer program, characterized in code means, which when run by processing means causes said processing means to execute any method according to embodiments of the present invention. Further, embodiments of the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of embodiments of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
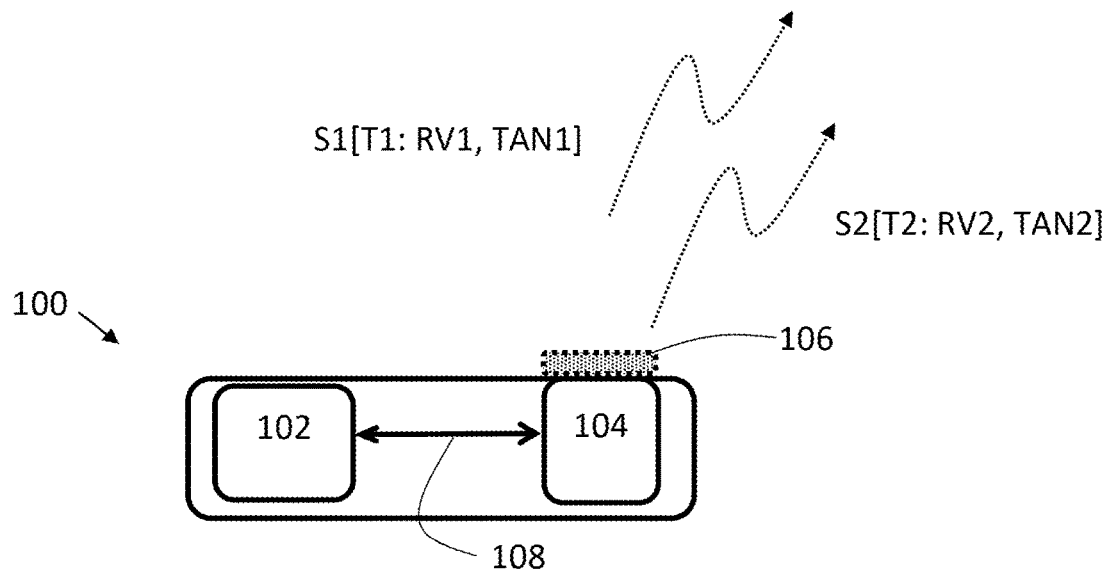
FIG. 1 shows a client device according to an embodiment of the invention.

FIG. 1 shows a client device 100 according to an embodiment of the invention. The client device 100 in this particular embodiment comprises a processor 102 coupled to a transceiver 104. The processor 102 and the transceiver 104 are coupled to each other by means of communication means 108 known in the art as illustrated in FIG. 1 with the solid arrow. The client device 100 further comprises an antenna 106 coupled to the transceiver 104, which means that the client device 100 is configured for wireless communications in a wireless communication system.

The client device 100 is configured to transmit a first signal S1 in a first grant-free transmission T1 to a network node 300. The first signal S1 comprises data which has a first redundancy version RV1 and a corresponding first transmission attempt number TAN1 (see FIGS. 7 and 9-12). The data is transmitted using a first resource unit RU1. The client device 100 is further configured to establish that a Negative Acknowledgment (NACK) associated with a data decoding error for the first grant-free transmission T1 has been received by the client device 100 or that an Acknowledgment (ACK) or NACK time-out associated with a client device activity detection error for the first grant-free transmission T1 has occurred. The client device 100 is further configured to transmit a second signal S2 in a second grant-free transmission T2 to the network node 300. The second signal S2 comprises the same data which has a second redundancy version RV2 and a corresponding second transmission attempt number TAN2 (see FIGS. 7 and 9-12). The data in second grant-free transmission T2 is transmitted using a second resource unit RU2.

Figure 2:
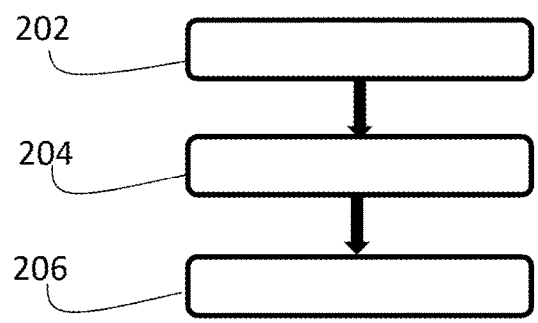
FIG. 2 shows a method according to an embodiment of the invention.

FIG. 2 shows a flow chart of a corresponding method 200 which may be executed in a client device 100, such as the one shown in FIG. 1. The method 200 comprises transmitting 202 a first signal S1 in a first grant-free transmission T1 to a network node 300, wherein the first signal S1 comprises data having a first redundancy version RV1 and having a corresponding first transmission attempt number TAN1, in a first resource unit RU1. The method 200 further comprises establishing 204 that a NACK associated with a data decoding error for the first grant-free transmission T1 has been received by the client device 100 or that a ACK or NACK time-out associated with a client device activity detection error for the first grant-free transmission T1 has occurred. The method 200 further comprises transmitting 206 a second signal S2 in a second grant-free transmission T2 to the network node 300, wherein the second signal S2 comprises the data having a second redundancy version RV2 and having a corresponding second transmission attempt number TAN2, in a second resource unit RU2.

The client device 100 herein may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The client device 100 may also be configured for communication in 3GPP related LTE and LTE-Advanced, in WiMAX and its evolution, and in fifth generation wireless technologies, such as New Radio.

Figure 3:
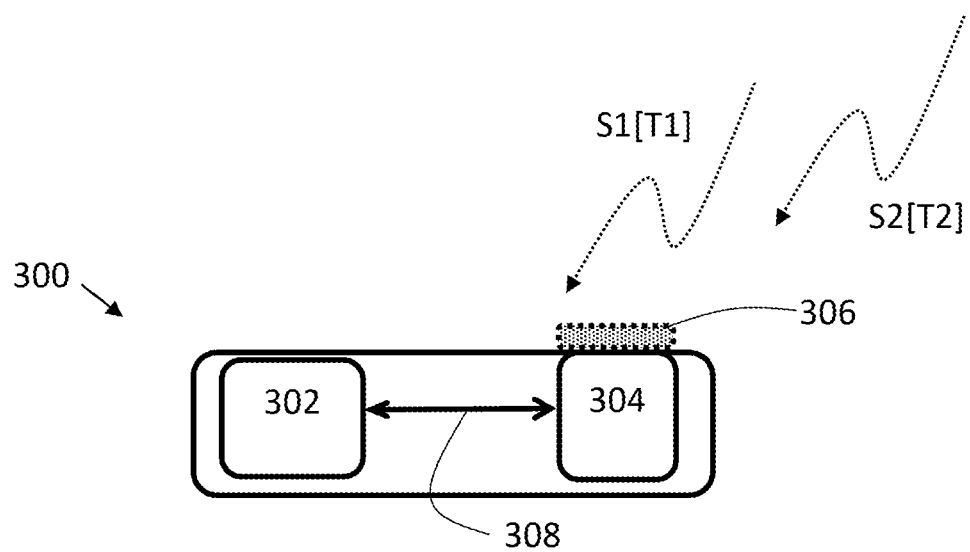
FIG. 3 shows a network node according to an embodiment of the invention

FIG. 3 shows a network node 300 according to an embodiment of the invention. The network node 300 in this particular embodiment comprises a processor 302 coupled to a transceiver 304. The processor 302 and the transceiver 304 are coupled to each other by means of communication means 308 known in the art as illustrated in FIG. 3. The network node 300 further comprises an antenna 306 coupled to the transceiver 304 which means that the network node 300 is configured for wireless communication in a wireless communication system.

The network node 300 is configured to receive a first signal S1 in a first grant-free transmission T1 from a client device 100, such as the one show in FIG. 1. The first signal S1 comprises data which has a first redundancy version RV1 and a corresponding first transmission attempt number TAN1. The data is received in a first resource unit RU1. The network node 300 is further configured to determine an identity of the client device 100 based on the first signal S1, and configured to establish that a data decoding error associated with the first grant-free transmission T1 has occurred if the data corresponding to the client device 100 in the first signal S1 cannot be decoded correctly. If the network nodes 300 determines such failure it expects that the client device 100 tries to send the data again and correspondingly expects a second signal S2 to be received from the client device 100. The network node 300 is further configured to receive said second signal S2 in a second grant-free transmission T2 from the client device 100. The second signal S2 comprises the data which has a second redundancy version RV2 and a corresponding second transmission attempt number TAN2. The data is received in a second resource unit RU2. The network node 300 is further configured to establish that a client device activity detection error associated with the second grant-free transmission T2 has occurred if the second signal S2 does not pass a client device activity detection test, and configured to establish that a data decoding error associated with the second grant-free transmission T2 has occurred if the data corresponding to the client device 100 in the second signal S2 cannot be decoded correctly.

Figure 4:
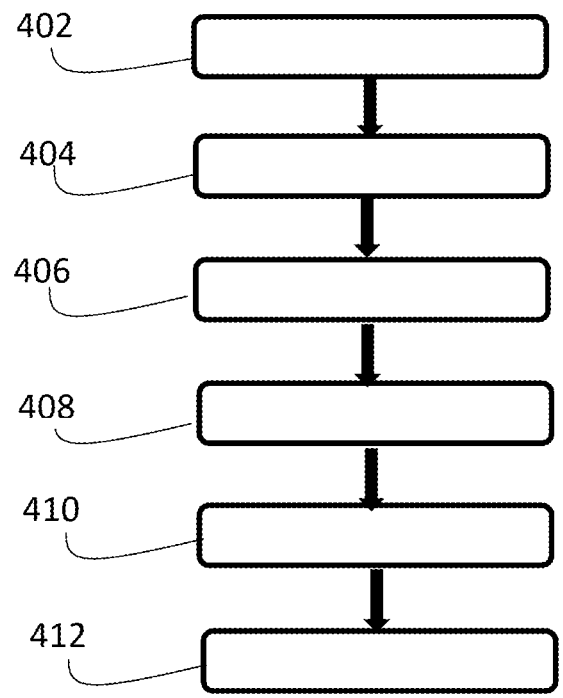
FIG. 4 shows a method according to an embodiment of the invention.

FIG. 4 shows a flow chart of a corresponding method 400 which may be executed in a network node 300, such as the one shown in FIG. 3. The method 400 comprises receiving 402 a first signal S1 in a first grant-free transmission T1 from a client device 100, wherein the first signal S1 comprises data having a first redundancy version RV1 and having a corresponding first transmission attempt number TAN1, in a first resource unit RU1. The method 400 further comprises determining 404 an identity of the client device 100 based on the first signal S1, and establishing 406 that a data decoding error associated with the first grant-free transmission T1 has occurred if the data corresponding to the client device 100 in the first signal S1 cannot be decoded correctly (and expect a second signal S2 to be received from the client device 100). The method 400 further comprises receiving 408 a second signal S2 in a second grant-free transmission T2 from the client device 100, wherein the second signal S2 comprises the data having a second redundancy version RV2 and having a corresponding second transmission attempt number TAN2, in a second resource unit RU2. The method 400 further comprises establishing 410 that a client device activity detection error associated with the second grant-free transmission T2 has occurred if the second signal S2 does not pass a client device activity detection test, and establishing 412 that a data decoding error associated with the second grant-free transmission T2 has occurred if the data corresponding to the client device 100 in the second signal S2 cannot be decoded correctly.

The network node 300 herein may also be denoted as a radio network node, an access network node, an access point, or a base station, e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM). The network node may also be a base station corresponding to the fifth generation (5G) wireless systems.

Figure 5:
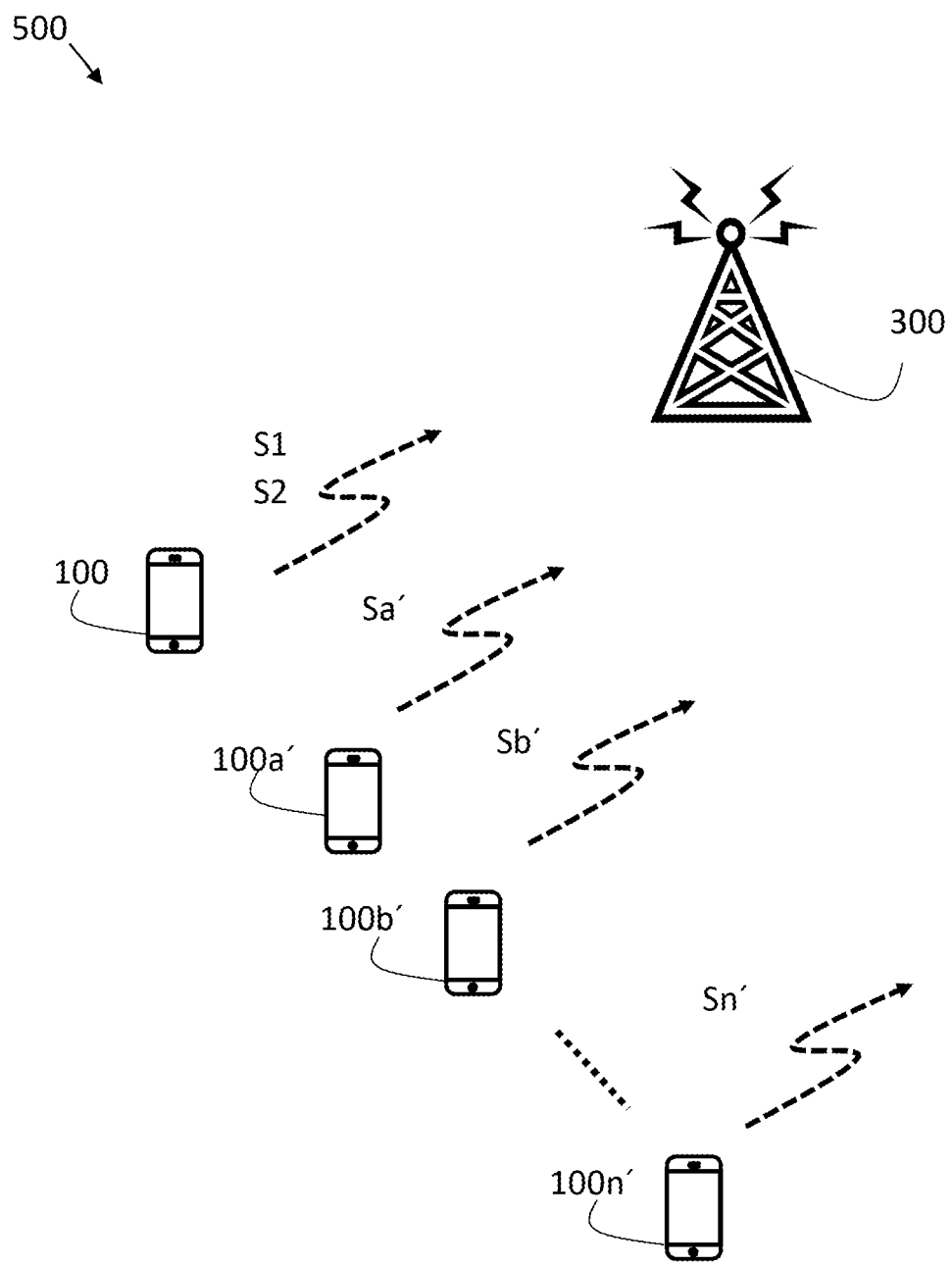
FIG. 5 illustrates a grant-free communication system model.

In a grant-free transmission mode, the network node 300 in general receives a signal comprising of reference signals and data from the client device 100 along with signals from other client devices, i.e. a superposed signal. This is illustrated in FIG. 5 in which the client device 100 and a plurality of other client devices 100$a'$, 100$b'$, ..., 100$n'$ are simultaneously transmitting using grant-free transmissions to the network node 300 in a wireless communication system 500. Hence, the first S1 and the second signals S2 received by the network node may also in this example contain data transmitted by the other client devices 100$a'$, 100$b'$, ..., 100$n'$ in signals Sa', Sb', ..., Sn'. This is different from the case when only the client device 100 transmits to the network node 300, and the first S1 and the second signals S2 received by the network node 300 in this case only comprises the first S1 and the second signals S2 transmitted by the client device 100.

In the following disclosure further embodiments of the invention are in some examples described and explained in a 3GPP system context, such as long term evolution (LTE) and LTE Advanced. In this respect 3GPP terminology and expressions may be used for providing deeper understanding of embodiments of the invention and for providing implementation examples. In these cases, the client device 100 corresponds to a UE and the network node 300 corresponds to a eNodeB. It is however to be noted that embodiments of the invention is not limited to 3GPP communication systems and can be implemented and used in any suitable communication system.

One of the possible ways to reduce signalling overhead and delay associated with scheduling request (SR) and SG is to use grant-free transmissions in UL. In general, the network node has a pool of time-frequency resources that needs to be allocated to grant-based and grant-free UL services. The network node 300 allocates a part of the total available time-frequency resources to grant-free UL services and the remaining to the grant-based UL services. The resources allocated for grant-free UL transmissions are typically known as CTU. In some case, the network node 300 may further divide a CTU into:

Contention-Free Transmission Unit (CFTU) to support client devices which have stringent latency requirements as in URLLC communication.

Contention-Based Transmission Unit (CBTU) to support mMTC devices including devices which have very small amount of periodic data to be sent to the network node 300.

In this disclosure, we use CTU to denote the resources used for any type of grant-free UL transmission. Each resource region allocated to either grant-based or grant-free UL may further comprise of one or more RUs.

In case of RUs belonging to resources for grant-based UL transmissions, the client device 100 sends a SR using UL control signalling. The network node 300 then sends a SG using the downlink control signalling. The SG typically contains the information about the RUs, modulation and coding scheme (MCS) format should be used by a given client device 100 for its UL transmission. In some scenarios, SG may also consist of the redundancy version (RV) to be used for the UL transmission. There is no collision occurring on the RUs corresponding to the resources for grant-based UL transmissions.

In case of RUs belonging to CTU, the assignment of RUs to different client devices is typically defined beforehand, for example as a part of a standard specification. In general, the assignment of RUs in the CTU to different client devices can be done based on some form of client device identity. One RU in a CTU region may be assigned to more than one client device. At any given time, all client devices that have data to send using the assigned RUs in CTU transmit without sending SR and receiving SG. On a given RU, more than one client device can transmit data in any given sub-frame. The network node 300 typically does not have the knowledge of which of the client devices that were assigned the RU are transmitting at the current time. Even though more than one client device is transmitting on the same RU, they use orthogonal signatures for transmission of reference signals. The network node 300 then performs joint detection of active client devices and their data. Typically, the network node 300 first performs correlation of different client device signatures with the received reference signals and then decide on the set of active client devices. Once the network node 300 has the set of active client devices, then it can either perform joint maximum likelihood detection or use sub-optimal iterative interference cancellation techniques to decode the active client devices' data. If a client device data is successfully detected, the network node 300 can send an ACK signal to the client device using downlink control signalling. If a client device data is decoded in error (can be detected e.g. by using a CRC failure) the network node 300 could send a NACK signal to the client device 100 (based on the established identity) using downlink control signalling.

Figure 6:
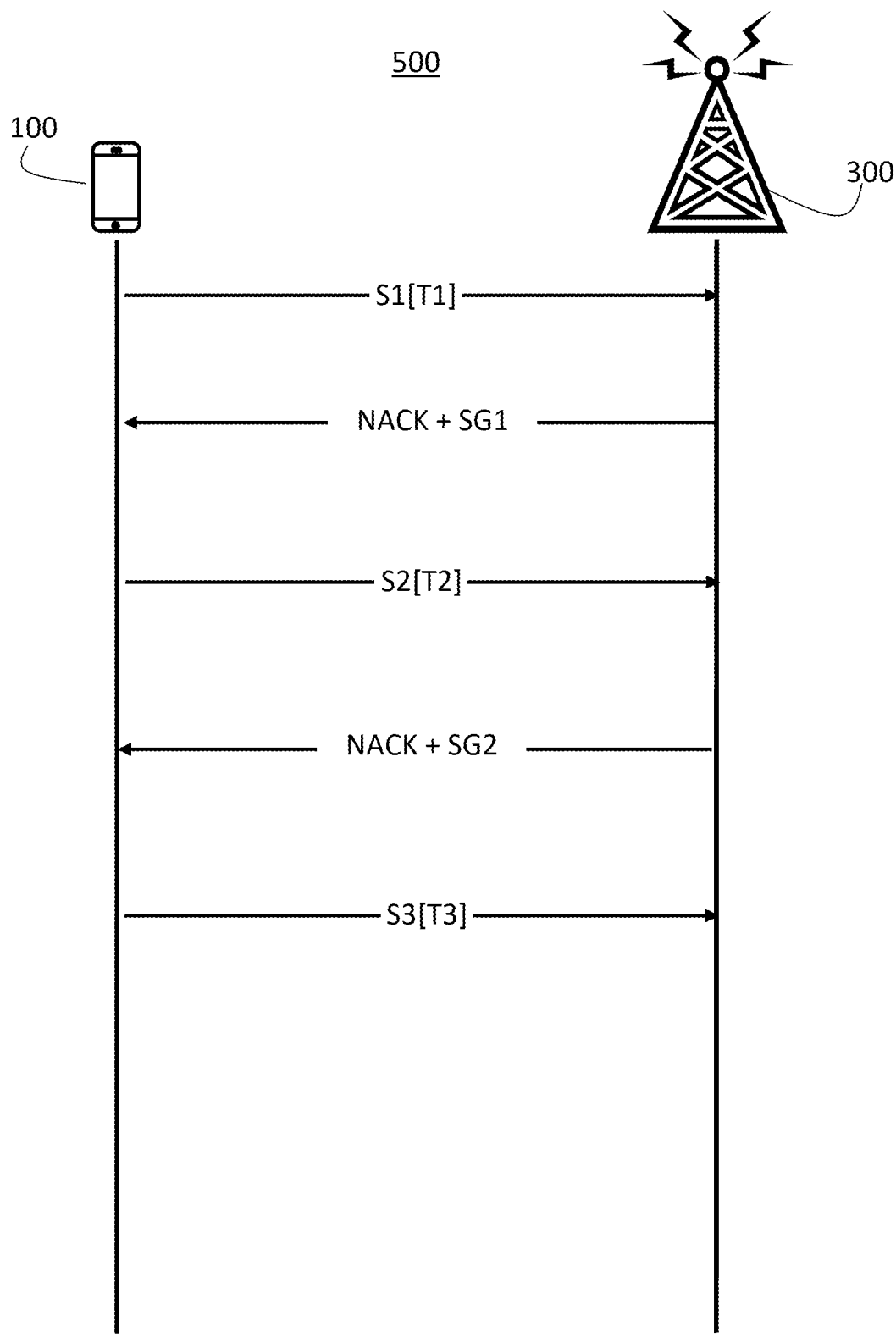
FIG. 6 shows a wireless communication system according to an embodiment of the invention.

FIG. 6 illustrates signalling aspects according to further embodiments of the invention. The transmission of the first signal S1 and the second signal S2 from the client device 100 to the network node 300 as previously described is shown in FIG. 6. Further, the transmission of NACK associated with the first grant-free transmission T1 and a first Scheduling Grant SG1, and NACK associated with the second grant-free transmission T2 and a second Scheduling Grant SG2 from the network node are also shown in FIG. 6.

Therefore, the client device 100 is configured to receive a NACK associated with the first grant-free transmission T1 and a first scheduling grant SG1 from the network node 300, and to transmit the second signal S2 using the information contained in the first scheduling grant SG1.

Correspondingly, the network node 300 is configured to upon establishing that the data decoding error associated with the first grant-free transmission T1 has occurred, transmit a NACK associated with the first grant-free transmission T1 and a first scheduling grant SG1 to the client device 100 based on the determined identity of the client device 100. The NACK and SG1 are sent to the client device 100 by using downlink control signaling, for example, as a part of downlink control information (DCI) or using a separate physical hybrid ARQ-indicator channel.

FIG. 6 further shows the transmission of a third signal S3 from the client device 100 to the network node 300. The client device 100 is therefore configured to establish that a NACK associated with a data decoding error for the second grant-free transmission T2 has been received by the client device 100 or that a ACK or NACK time-out associated with a client device activity detection error for the second grant-free transmission T2 has occurred. The client device 100 is further configured to transmit a third signal S3 in a third grant-free transmission T3 to the network node 300, wherein the third signal S3 comprises the data having a third redundancy version RV3 and having a corresponding third transmission attempt number TAN3, in a third resource unit RU3.

The client device 100 is moreover in an embodiment configured to receive a NACK associated with the second grant-free transmission T2 and a second scheduling grant SG2 from the network node 300, and to transmit the third signal S3 using information contained in the second scheduling grant SG2.

The network node 300 is correspondingly configured to transmit a NACK associated with the second grant-free transmission T2 and a second scheduling grant SG2 to the client device 100 based on the determined identity, e.g. by using downlink control signaling.

In general, if the data packet received in grant-free transmission mode from a client device 100 is in error, the network node 300 may send an SG together with NACK signalling to the client device 100 using downlink control signalling. The SG may carry the information regarding the RU to be used for the next transmission attempt and/or modulation and coding scheme (MCS) format to be used during the next transmission attempt (such as T2 and T3) and/or the redundancy version to be used during the next transmission attempt. The RU allocated to the client device 100 for retransmission may belong to either grant-free resource region (CTU) or to the resources allocated for the grant-based services. After receiving the information regarding the RU and/or the MCS format and/or RV to be used for next transmission attempt, the client device 100 retransmits the data on the informed RU using MCS format, and RV value contained in the SG received in downlink control signalling.

Figure 7:
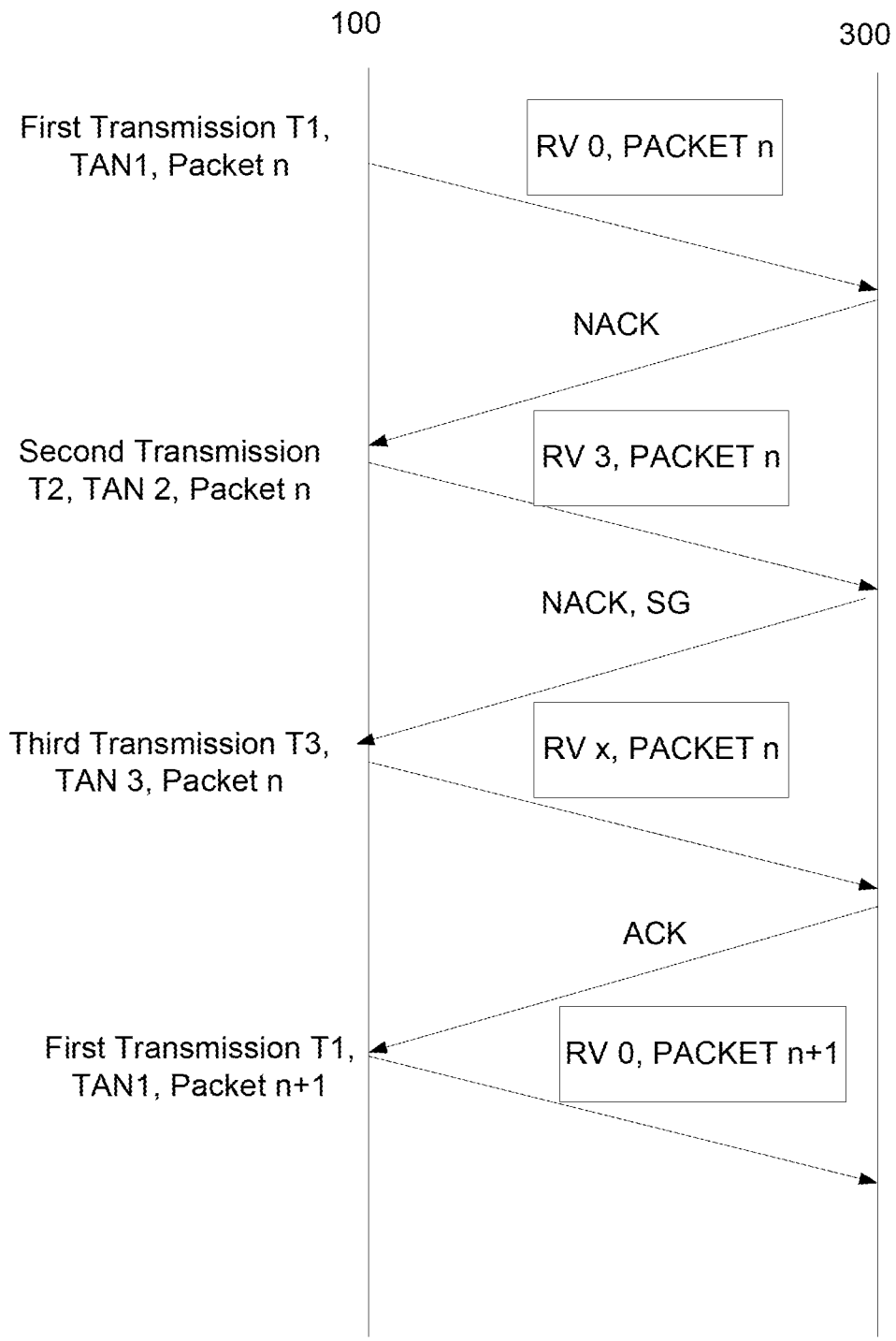
FIG. 7 illustrates transmission, reception and signalling according to an embodiment of the invention.

An example illustration for this scenario is given in FIG. 7, which shows an example scenario in which the network node 300 may send an SG together with NACK using the downlink control signalling. In this example scenario, the client device 100 sends data (in data packet n) having RV 0 in a first grant-free transmission T1. The network node 300 simply sends a NACK signal after establishing a data decoding error (e.g. CRC failure) of the data transmitted in the first grant-free transmission T1. After receiving NACK for the first grant-free transmission T1, the client device 100 sends the data using RV3 in the second grant-free transmission T2. After receiving the second grant-free transmission T2 and establishing another data decoding error associated with T2 at the network node 300, the network node 300 may send a SG along with a NACK using downlink control signalling as shown in FIG. 7. After receiving NACK associated with the second grant-free transmission T2 and the SG, the client device 100 uses the information contained in the SG to send the data having RV x (the information about the RV to be used maybe contained in the SG received in downlink) in a third grant-free transmission T3 to the network node 300. The network node 300, after receiving the third grant-free transmission T3 and a successful decoding of data sends an ACK signal to the client device 100 using the downlink signalling.

In some cases, the network node 300, may not have knowledge about the RV versions used by the client device 100 for its data transmission. Hence, it may not been possible for the network node 300 to perform HARQ combining. Therefore, in one embodiment the first grant-free transmission T1 comprises a first new data indicator NDI1 flag and information about the first redundancy version RV1, the second grant-free transmission T2 comprises a second new data indicator NDI2 flag and information about the second redundancy version RV2, and the third grant-free transmission T3 comprises a third new data indicator NDI3 flag and information about the third redundancy version RV3.

Figure 8:
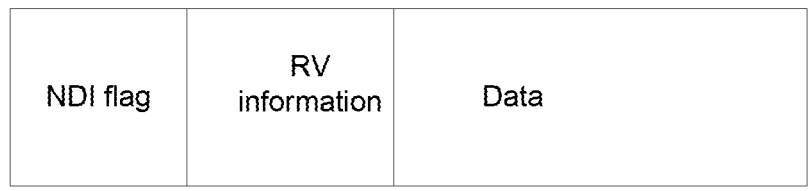
FIG. 8 shows different message formats according to embodiments of the invention.
Figure 8:
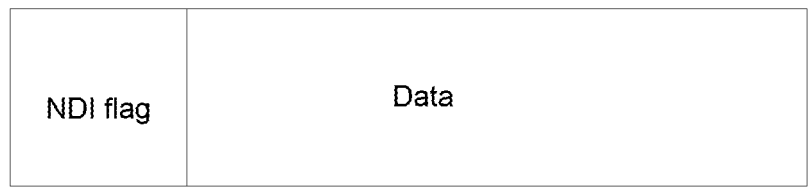
Figure 8:
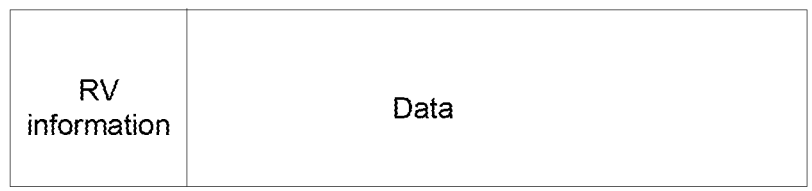

FIG. 8 shows an example of uplink data to be transmitted to the network node from a client device 100 using grant-free UL resources. Using one embodiment of the invention, grant-free transmission may contain information about both the NDI flag and RV information along with data as shown in the exemplary top message format in FIG. 8. Using another embodiment of the invention, the grant-free transmission from the client device 100 may contain only one of NDI flag or RV information along with data as shown in the exemplary middle and bottom message formats, respectively, in FIG. 8. This information regarding NDI flag and RV information can be sent using separate resources or together with the data in the UL RU. When sending information regarding NDI and RV along with data one may embed this information in UL reference signals. Sending the information regarding NDI flag and/or RV version information to the network node 300 can facilitate the network node 300 perform HARQ combining.

In another embodiment, the client device 100 is configured to choose a redundancy version, RV1; RV2, RV3, for the data to be transmitted in dependence on the transmission attempt number TAN1, TAN2, TAN3, and wherein a correspondence between redundancy version and transmission attempt number is predetermined. This embodiment is an alternative to the embodiment described above in which the grant-free transmission from the client device 100 comprises new data indicator flag and information about the redundancy version.

The idea of this embodiment of the invention is to reduce the signalling overhead associated with sending NDI flag and/or RV information to the network node 300. For this purpose, the redundancy versions to be used during retransmissions using grant-free UL can be predetermined. That is, there can be a certain pre-defined (possibly fixed) mapping of redundancy version to transmission attempt of data. The redundancy versions to be used during different transmission attempts of the same data can be different or the same. This kind of pre-defined RV to be used for transmissions is known as non-adaptive HARQ.

As an example, if the maximum transmission attempt number for a data packet at the L1 layer is 4, the predetermined redundancy versions can be [0 3 2 1] or [0 0 0 0]. Note that if the same redundancy version is used during all transmission attempts of data packet, it is known as Chase combining (CC)-HARQ, in this case, the network node 300 may simply perform addition of log-likelihood ratio (LLR) values. If the redundancy versions for different transmission attempt numbers are different, it is known as incremental redundancy (IR)-HARQ. In this case, the network node 300 may perform code combining. One can view CC-HARQ as a special case of IR-HARQ.

In another example scenario, if only two transmission attempts are allowed, the redundancy versions to be used can be predetermined as [0 2] or [0 0].

In another embodiment, the client device 100 is configured to choose the second transmission attempt number TAN2 to be equal to the first transmission attempt number TAN1 incremented by one if it is established that the NACK associated with a data decoding error for the first grant-free transmission T1 has been received by the client device 100.

In another embodiment, the client device 100 is configured to choose the third transmission attempt number TAN3 to be equal to the second transmission attempt number TAN2 incremented by one if it is established that the NACK associated with a data decoding error for the second grant-free transmission T2 has been received by the client device 100.

Figure 9:
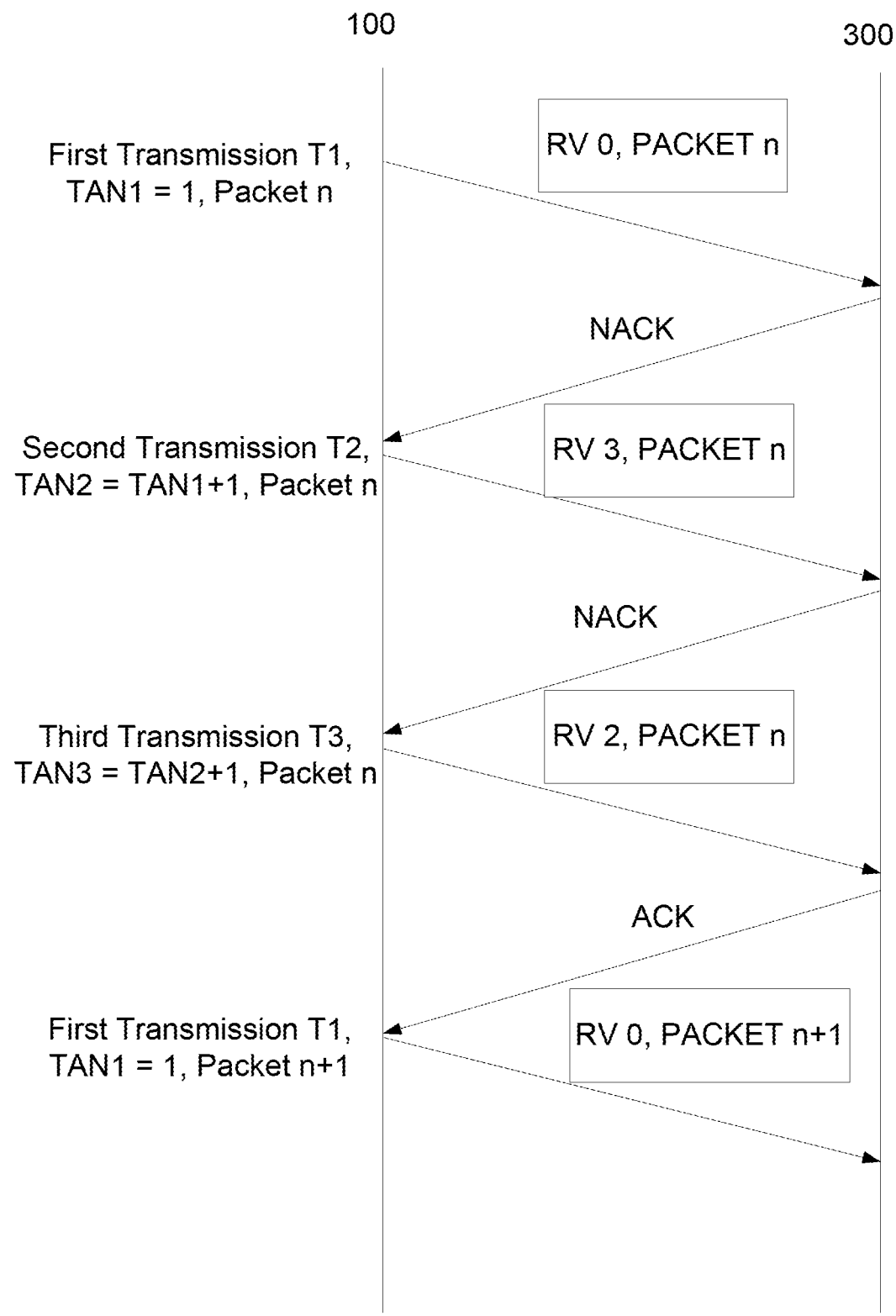
FIG. 9 illustrates transmission, reception and signalling according to an embodiment of the invention.

If a client device 100 receives a NACK signalling for its transmitted data, during the retransmission of the same data, it increments the transmission attempt number counter by one and uses the pre-defined redundancy version corresponding to the new transmission attempt number. An example case is illustrated in FIG. 9, in which the maximum number of transmission attempts is 3 and the pre-defined RV ordering for different transmission attempts of the same data is [0 3 2]. In FIG. 9, during the first grant-free transmission T1, the first transmission attempt number TAN1 is set to 1 and the client device 100 selects RV 0 for transmission. After receiving the first grant-free transmission T1 and establishing a data decoding error (e.g. CRC failure), the network node 300 sends a NACK signal to the client device 100 using downlink control signalling. After receiving a NACK from the network node 300 for the first grant-free transmission T1, the second transmission attempt number TAN2 is set as TAN2=TAN1+1, i.e. 2, and the client device 100 chooses RV 3 for the second grant-free transmission T2 of the same data. The network node 300 after receiving the first grant-free transmission T1 and establishing a data decoding error (e.g. CRC failure), sends a NACK signal to the client device 100 using downlink control signalling. After receiving NACK for the second grant-free transmission T2, the third transmission attempt number TAN3 is set to 3 and the client device 100 chooses RV 2 for the third grant-free transmission T3 of the data. After receiving the third grant-free transmission T3 and a successful decoding of data, the network node 300 sends an ACK signal to the client device 100 using the downlink signalling.

In current LTE systems, the uplink data transmissions are contention-free and do not carry new data indicator (NDI) flag and the redundancy version (RV) information. This is because the network node 300 is in control of the transmissions from the client device 100. However, in grant-free UL transmission scenarios, the client devices typically send data without any SR and SG signalling. Moreover, because of the blind active client device and data detection, there is a possibility of a client device activity detection error at the network node 300. In such cases, the network node 300 may neither send ACK or NACK signal to the client device 100 and a feedback signalling time-out occurs at the client device 100. Conventional solutions have not considered the mechanisms to handle such scenarios.

In case of a retransmission from a client device 100 which has experienced a client device activity detection error during the previous transmission, the network node 300 cannot distinguish whether the next transmission received from the client device 100 is a new transmission or a retransmission. There are different solutions how this can be resolved.

In one embodiment, the client device 100 is configured to choose the second transmission attempt number TAN2 to be the same as the first transmission attempt number TAN1 so that the second redundancy version RV2 is the same as the first redundancy version RV1 if it is established that the ACK or NACK time-out associated with a client device activity detection error for the first grant-free transmission T1 has occurred. In an alternative embodiment, the client device 100 is configured to choose the third transmission attempt number TAN3 to be the same as the second transmission attempt number TAN2 so that the third redundancy version RV3 is the same as the second redundancy version RV2 if it is established that the ACK or NACK time-out associated with a client device activity detection error for the second grant-free transmission T2 has occurred.

The client device 100 which experiences a ACK or NACK feedback time-out may use the same RV during retransmission as in the previous transmission attempt (which experienced a feedback time-out) until it receives ACK or NACK signalling.

Figure 10:
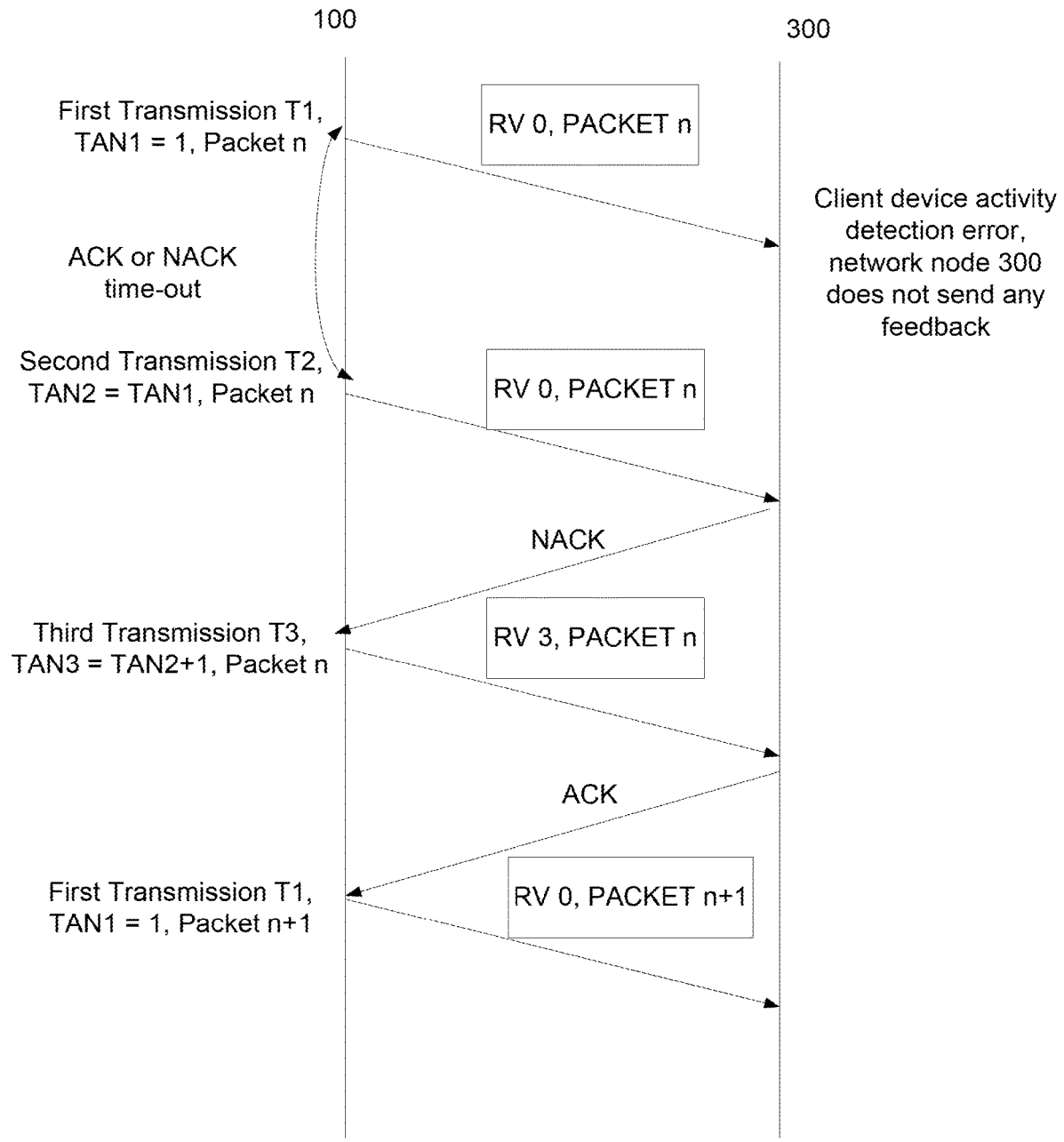
FIG. 10 illustrates transmission, reception and signalling according to an embodiment of the invention.
Figure 11:
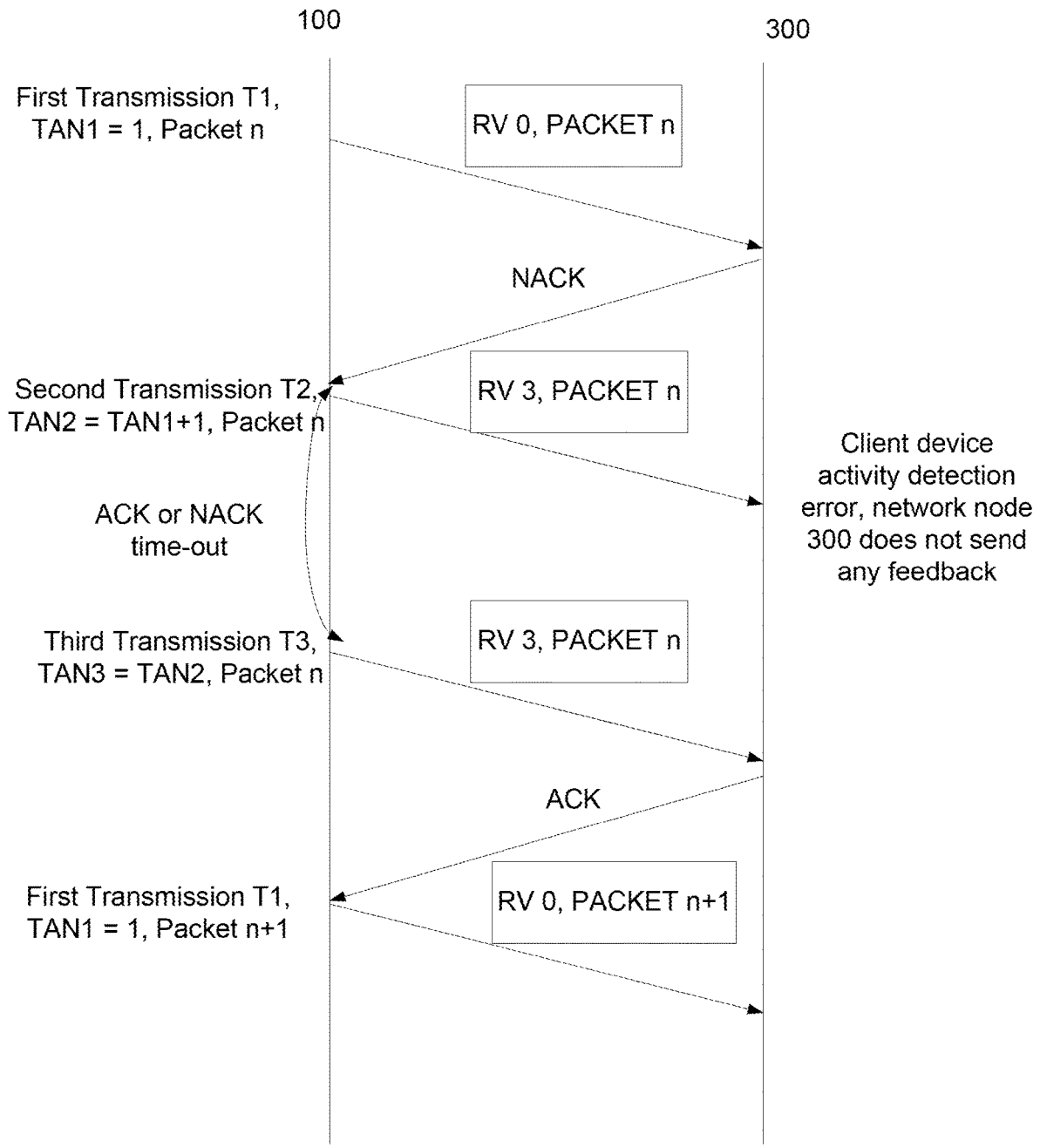
FIG. 11 illustrates transmission, reception and signalling according to an embodiment of the invention.

Moreover, if an ACK or NACK time-out occurs, the transmission attempt number of the next transmission can be the same as the previous transmission attempt number (transmission attempt counter is not incremented immediately following a ACK or NACK time-out). This embodiment is illustrated in FIGS. 10 and 11. It was herein assumed that maximum number of transmission attempts is limited to 3 and the RV versions to be used during different transmission attempts is pre-defined as [0 3 2].

FIG. 10 shows the ways in which ACK or NACK time-out is handled by the client device 100 if the client device activity detection error occurs during first transmission of a data packet n. In FIG. 10, for the first grant-free transmission T1 from the client device 100, the first transmission attempt number TAN1 is set to 1 and the corresponding RV 0 is used. The client device activity detection error occurs at the network node 300. The network node 300 cannot send any feedback signal. After the ACK or NACK time-out associated with the client device activity detection error of the first grant-free transmission T1, the client device 100 resends the data using a second grant-free transmission T2 by setting the second transmission attempt number TAN2=TAN1 and using the same redundancy version RV 0 as in the previous transmission attempt. The network node 300 after receiving the second grant-free transmission T2 and establishing a data decoding error (e.g. CRC failure), sends a NACK signal to the client device 100 using downlink control signalling. After receiving NACK for the second grant-free transmission T2, the client device 100 increments the transmission attempt number counter by setting the third transmission attempt number TAN3=TAN2+1 and choosing the corresponding RV 3 for the third grant-free transmission T3. After receiving the third grant-free transmission T3 and a successful decoding of data, the network node 300 sends an ACK signal to the client device 100 using the downlink signalling.

FIG. 11 shows the ways in which ACK or NACK time-out is handled by the client device 100, if missed detection occurs during a retransmission of a data packet. In FIG. 11, for the first grant-free transmission T1 from the client device 100, the first transmission attempt number TAN1 is set to 1 and the corresponding RV 0 is used for transmission. After receiving the first grant-free transmission T1 and establishing a data decoding error (e.g. CRC failure), the network node 300 sends a NACK signal to the client device 100 using downlink control signalling. After receiving the NACK signal from the network node 300 for first grant-free transmission T1, the client device 100 sets the second transmission attempt number TAN2=TAN1+1 and accordingly chooses the RV 2 for the second grant-free transmission T2 of the data. The client device activity detection error occurs at the network node 300 for the second transmission attempt of data. The network node 300 does not send any feedback signal. After the ACK or NACK time-out, the client device 100 sets the third transmission attempt number TAN3=TAN2 and uses the same redundancy version RV 3 for the third grant-free transmission T3. After receiving the third grant-free transmission T3 and a successful decoding of data, the network node 300 sends an ACK signal to the client device 100 using the downlink signalling. Using this approach, the additional signalling carrying NDI and RV versions can be avoided. Moreover, if the network node 300 detects the subsequent transmission attempt, it can implicitly obtain the knowledge of the RV of the current transmission and possibly perform HARQ combining.

The network node 300 is configured to transmit a NACK after establishing a client device activity detection error associated with the second grant-free transmission T2 to the client device 100 based on the determined identity, e.g. by using downlink control signaling.

If the client device activity detection error occurs at the network node 300 during the retransmission attempt of a data packet, the network node 300 sends a NACK signal to the client device 100 using downlink control signalling. This is possible, because if we assume synchronous operation of HARQ, the network node 300 expects the retransmission from the client device 100 in a particular sub-frame (or frame or symbol) number. Even if the network node 300 cannot detect the client device 100 using the received grant-free UL signals in the particular sub-frame number, the network node 300 can still send a NACK signal to the client device. Once a NACK signal is received, the client device 100 can increment its transmission attempt counter number and resend the data packet using the next pre-defined redundancy version.

Figure 12:
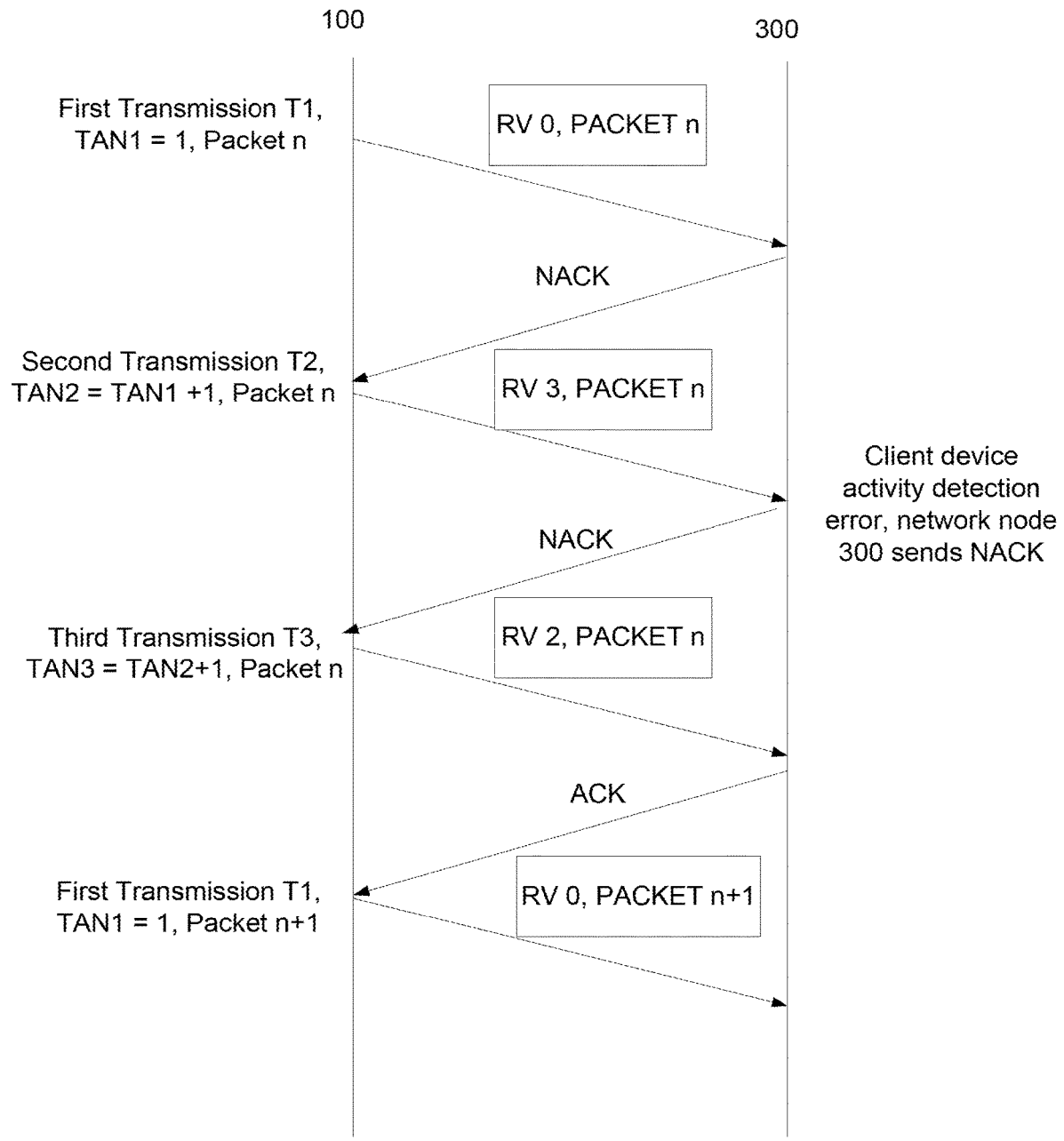
FIG. 12 illustrates transmission, reception and signalling according to an embodiment of the invention.

An example for this scenario is illustrated in FIG. 12. FIG. 12 shows the network node 300 sending a NACK if the client device activity detection error occurring during a retransmission attempt. For the illustration in FIG. 12, it was assumed that maximum number of transmission attempts was limited to 3 and the RV versions to be used during different transmission attempts is pre-defined as [0 3 2]. In FIG. 12, for the first grant-free transmission T1 from the client device 100, the first transmission attempt number TAN1 is set to 1 and the corresponding RV 0 is used for transmission. After receiving the first grant-free transmission T1 and establishing a data decoding error (e.g. CRC failure), the network node 300 sends a NACK signal to the client device 100 using downlink control signalling. After receiving the NACK signal from the network node 300 for first grant-free transmission T1, the client device 100 sets the second transmission attempt number TAN2=TAN1+1 and accordingly chooses the RV 2 for the second grant-free transmission T2 of the data. The client device activity detection error occurs at the network node 300 for the second transmission attempt of data. The network node 300 sends a NACK signal for the second grant-free transmission T2 after the client device activity detection error. After receiving NACK for the second grant-free transmission T2, the client device 100 sets the third transmission attempt number TAN3=TAN2+1 and uses the RV 2 for the third grant-free transmission T3. After receiving the third grant-free transmission T3 and a successful decoding of data, the network node 300 sends an ACK signal to the client device 100 using the downlink signalling.

In an embodiment, at least one of the first resource unit RU1, the second resource unit RU2, and the third resource unit RU3 is predetermined.

As an alternative embodiment, the client device 100 may choose at least one of the first resource unit RU1, the second resource unit RU2, and the third resource unit RU3 in dependence on at least one of the identity of the client device 100, a grant-free transmission sub-frame number, and a transmission attempt number TAN1, TAN2, TAN3.

Typically, the mapping of RUs to client devices in a CTU region is done based on a client device identity. This mapping rule is pre-determined so that the client device 100 obtains the knowledge about this mapping rule based on the client device identity assigned by the network node 300. In certain situations, the network node 300 can decide on a new mapping (or assignment) of RUs to client devices and send the new mapping information to the client devices using the downlink control signalling. This requires additional downlink control signalling resources.

As previously mentioned, the RU to client device mapping can be pre-defined. However, in case of a client device 100 which received a NACK signal from the network node 300 may use a RU which is different from the one used during previous transmission attempt of a data. The new RU that should be used during the retransmission can be a function of the client device ID, and/or sub-frame (or frame or symbol) number and/or the transmission attempt of the given data packet. That is, during a first transmission attempt of a data packet, all the client devices use the pre-defined RU to UE mapping or the mapping signalled by the network node to select the RU on which they send their data packet. If a given client device 100 receives a NACK signal after a transmission failure, then it uses the pre-defined logic to select a new RU for retransmission based on at least one of the client device ID, sub-frame (or frame or symbol) number and the transmission attempt number of the data. The network node 300, using the same logic can deduce the information regarding the RU index on which the given client device retransmits its data. If a client device receives an ACK signal, then it may use the default RU index according the pre-defined mapping or the mapping signalled by the network node 300.

Furthermore, any method according to embodiments of the invention may be implemented in a computer program, having code means, which when run by processing means causes the processing means to execute the steps of the method. The computer program is included in a computer readable medium of a computer program product. The computer readable medium may comprises essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the network node 300 comprise communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, digital signal processors (DSPs), mass storage devices (MSDs), trellis-coded modulation (TCM) encoder, TCM decoder, power supply units, power feeders, communication interfaces, communication protocols, etc. which are suitably arranged together for performing the present solution.

The processor 302, 102 of the network node 300 and the client device 100, respectively, may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

It should be understood that the invention is not limited to the exemplary embodiments described above.

Additionally, statements made herein characterizing the invention refer to an embodiment of the invention and not necessarily all embodiments.

What is claimed is:

1. A client device for a wireless communication system, the client device comprising a processor and a non-transitory memory having processor-executable instructions stored thereon, wherein the processor-executable instructions, when executed by the processor, facilitate:
    choosing, for data to be transmitted, a first redundancy version based on a first transmission attempt number for the data, wherein a correspondence between the first redundancy version and the first transmission attempt number is predetermined;
    transmitting, in a first resource unit, a first signal in a first grant-free transmission to a network node, wherein the first signal comprises data corresponding to the first redundancy version, and the first signal does not explicitly indicate a redundancy version of the data in the first signal;
    establishing that a Negative Acknowledgment (NACK) associated with a data decoding error for the first grant-free transmission together with a first scheduling grant have been received by the client device or that an Acknowledgement (ACK) or NACK time-out associated with a client device activity detection error for the first grant-free transmission has occurred; and
    transmitting, in a second resource unit, a second signal in a second transmission to the network node, wherein the second signal comprises data corresponding to a second redundancy version.

2. The client device according to claim 1, wherein the processor-executable instructions, when executed by the processor, further facilitate:
    establishing that a NACK associated with a data decoding error for the second transmission has been received by the client device or that an ACK or NACK time-out associated with a client device activity detection error for the second transmission has occurred; and
    transmitting, in a third resource unit, a third signal in a third transmission to the network node, wherein the third signal comprises data corresponding to a third redundancy version.

3. The client device according to claim 2, wherein the processor-executable instructions, when executed by the processor, further facilitate:
    based on a NACK associated with a data decoding error for the first grant-free transmission has having been received by the client device, choosing a second transmission attempt number, corresponding to the data in the second signal, to be equal to the first transmission attempt number incremented by one; and
    based on a NACK associated with a data decoding error for the second transmission having been received by the client device, choosing a third transmission attempt number, corresponding to the data in the third signal, to be equal to the second transmission attempt number incremented by one.

4. The client device according to claim 2, wherein the processor-executable instructions, when executed by the processor, further facilitate:
    based on an ACK or NACK time-out associated with a client device activity detection error for the first grant-free transmission having occurred, choosing a second transmission attempt number, corresponding to the data in the second signal, to be the same as the first transmission attempt number; or
    based on an ACK or NACK time-out associated with a client device activity detection error for the second transmission having occurred, choosing the third transmission attempt number, corresponding to the data in the third signal, to be the same as the second transmission attempt number.

5. The client device according to claim 2, wherein the processor-executable instructions, when executed by the processor, further facilitate: receiving the NACK associated with the second transmission together with a second scheduling grant from the network node via downlink control signalling; and
    wherein transmitting the third signal is based on information in the second scheduling grant.

6. The client device according to claim 1, wherein the first resource unit and/or the second resource unit is predetermined.

7. The client device according to claim 1, wherein the processor-executable instructions, when executed by the processor, further facilitate:
    choosing the first resource unit and/or the second resource unit based on an identity of the client device, a grant-free transmission sub-frame number, and/or a transmission attempt number.

8. The client device according to claim 1, wherein the processor-executable instructions, when executed by the processor, further facilitate: receiving the NACK associated with the first grant-free transmission together with the first scheduling grant from the network node via downlink control signalling; and
    wherein transmitting the second signal is based on information in the first scheduling grant.

9. The client device according to claim 1, wherein the processor-executable instructions, when executed by the processor, further facilitate:
    based on a NACK associated with a data decoding error for the first grant-free transmission having been received by the client device, choosing a second transmission attempt number, corresponding to the data in the second signal, to be equal to the first transmission attempt number incremented by one.

10. A network node for a wireless communication system, the network node comprising a processor and a non-transitory memory having processor-executable instructions stored thereon, wherein the processor-executable instructions, when executed by the processor, facilitate:
    receiving, in a first resource unit, a first signal in a first grant-free transmission from a client device, wherein the first signal comprises data corresponding to a first redundancy version, and the first signal does not explicitly indicate a redundancy version of the data in the first signal;
    determining an identity of the client device based on the first signal;
    determining that the data in the first signal corresponds to the first redundancy version based on a first transmission attempt number corresponding to the data in the first signal, wherein a correspondence between the first redundancy version and the first transmission attempt number is predetermined;

establishing that a data decoding error associated with the first grant-free transmission has occurred based on not being able to correctly decode the data in the first signal;

receiving, in a second resource unit, a second signal in a second transmission from the client device, wherein the second signal comprises data corresponding to a second redundancy version; and establishing that a data decoding error associated with the second transmission has occurred based on not being able to correctly decode the data in the second signal.

11. The network node according to claim 10, wherein the processor-executable instructions, when executed by the processor, further facilitate:

based on establishing that a data decoding error associated with the first grant-free transmission has occurred, transmitting a Negative Acknowledgment (NACK) associated with the first grant-free transmission together with a first scheduling grant to the client device based on the determined identity and via downlink control signalling.

12. The network node according to claim 10, wherein the processor-executable instructions, when executed by the processor, further facilitate:

transmitting a Negative Acknowledgment (NACK) associated with the second transmission together with a second scheduling grant to the client device based on the determined identity and via downlink control signalling.

13. The network node according to claim 10, wherein the second transmission is a grant-free transmission;

wherein the second signal does not explicitly indicate a redundancy version of the data; and wherein the processor-executable instructions, when executed by the processor, further facilitate: determining the data in the second signal corresponds to the second redundancy version based on a second transmission attempt number corresponding to the data in the second signal.

14. The network node according to claim 10, wherein determining the identity of the client device is further based on performing a client device activity detection test.

15. The network node according to claim 14, wherein the client device activity detection test includes:

computing a correlation coefficient between received reference signals with a set of known client device signatures; and comparing a resulting value of the correlation coefficient with a threshold value.

16. A method for a client device, the method comprising:

choosing, for data to be transmitted, a first redundancy version based on a first transmission attempt number for the data, wherein a correspondence between the first redundancy version and the first transmission attempt number is predetermined;

transmitting, in a first resource unit, a first signal in a first grant-free transmission to a network node, wherein the first signal comprises data corresponding to the first redundancy version, and the first signal does not explicitly indicate a redundancy version of the data in the first signal;

establishing that a Negative Acknowledgment (NACK) associated with a data decoding error for the first grant-free transmission together with a first scheduling grant have been received by the client device or that an Acknowledgement (ACK) or NACK time-out associated with a client device activity detection error for the first grant-free transmission has occurred; and transmitting, in a second resource unit, a second signal in a second transmission to the network node, wherein the second signal comprises data corresponding to the second redundancy version.

17. A method for a network node, the method comprising:

receiving, in a first resource unit, a first signal in a first grant-free transmission from a client device, wherein the first signal comprises data corresponding to a first redundancy version, and the first signal does not explicitly indicate a redundancy version of the data in the first signal;

determining an identity of the client device based on the first signal;

determining that the data in the first signal corresponds to the first redundancy version based on a first transmission attempt number corresponding to the data in the first signal, wherein a correspondence between the first redundancy version and the first transmission attempt number is predetermined;

establishing that a data decoding error associated with the first grant-free transmission has occurred based on not being able to correctly decode the data in the first signal;

receiving, in a second resource unit, a second signal in a second transmission from the client device, wherein the second signal comprises data corresponding to a second redundancy version; and establishing that a data decoding error associated with the second transmission has occurred based on not being able to correctly decode the data in the second signal.

* * * * *

UNITED STATES PATENT AND TRADEMARK OFFICE
CERTIFICATE OF CORRECTION

PATENT NO. : 10,931,427 B2
APPLICATION NO. : 16/368631
DATED : February 23, 2021
INVENTOR(S) : Tumula et al.

Page 1 of 1

It is certified that error appears in the above-identified patent and that said Letters Patent is hereby corrected as shown below:

In the Claims

Claim 3, Column 21, Line 54: "grant-free transmission has having been" should read -- grant-free transmission having been --.

Signed and Sealed this
Twelfth Day of July, 2022

Katherine Kelly Vidal
*Director of the United States Patent and Trademark Office*